United States Patent
Kadayam Viswanathan et al.

(10) Patent No.: US 9,880,319 B2
(45) Date of Patent: Jan. 30, 2018

(54) QUALITY METRICS FOR TIGHT OIL RESERVOIRS

(71) Applicant: Schlumberger Technology Corporation, Sugar Land, TX (US)

(72) Inventors: Ravinath Kausik Kadayam Viswanathan, Boston, MA (US); Andrew E. Pomerantz, Lexington, MA (US); Richard Lewis, Frisco, TX (US); Paul Ryan Craddock, Scituate, MA (US); Robert L. Kleinberg, Cambridge, MA (US); Frank P. Shray, Littleton, CO (US); Stacy Lynn Reeder Blanco, Littleton, MA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 576 days.

(21) Appl. No.: 14/505,322

(22) Filed: Oct. 2, 2014

(65) Prior Publication Data
US 2015/0094960 A1 Apr. 2, 2015

Related U.S. Application Data

(60) Provisional application No. 61/885,705, filed on Oct. 2, 2013, provisional application No. 61/885,718, filed (Continued)

(51) Int. Cl.
| | |
|---|---|
| *E21B 49/00* | (2006.01) |
| *G01V 11/00* | (2006.01) |
| *G01V 3/32* | (2006.01) |
| *G01V 3/30* | (2006.01) |
| *G01V 99/00* | (2009.01) |

(52) U.S. Cl.
CPC .............. *G01V 11/00* (2013.01); *E21B 49/00* (2013.01); *G01V 3/30* (2013.01); *G01V 3/32* (2013.01); *G01V 99/00* (2013.01)

(58) Field of Classification Search
CPC ................................ E21B 49/00; G01V 11/00
See application file for complete search history.

(56) References Cited

U.S. PATENT DOCUMENTS

| | | | |
|---|---|---|---|
| 4,686,364 A | 8/1987 | Herron | |
| 8,427,145 B2* | 4/2013 | Mitchell | G01N 24/081 324/303 |

(Continued)

OTHER PUBLICATIONS

Gonzalez et al., "Determination of Formation Organic Carbon content using a new Neutron Induced Gamma Ray Spectroscopy Service that directly measures carbon," SPWLA 54th Annual Logging Symposium, Jun. 22-26, 2013 (10 pages).

(Continued)

*Primary Examiner* — Bryan Bui
(74) *Attorney, Agent, or Firm* — Michael Dae

(57) ABSTRACT

Techniques for calculating metrics for reservoir quality based on light oil and total organic carbon in tight oil reservoirs are described. The techniques include calculating quantities of light oil and total organic carbon from logging data and generating therefrom a continuous log for reservoir quality metric. Additionally new reservoir quality indices are presented that more accurately predict reservoir quality in tight oil plays.

24 Claims, 5 Drawing Sheets

Related U.S. Application Data on Oct. 2, 2013, provisional application No. 61/994,177, filed on May 16, 2014.

(56) References Cited

U.S. PATENT DOCUMENTS 8,616,280 B2* 12/2013 Kaminsky ............... E21B 43/24
                                                      166/266
2016/0138392 A1 5/2016 Pomerantz et al.

OTHER PUBLICATIONS

Rylander et al., NMR T2 Distributions in the Eagle Ford Shale: Reflections on Pore Size, SPE 164554, presentation at the unconventional resources conference, The woodlands, Texas USA, Apr. 10-12, 2013 (15 pages).

Jarvie, D. M., 2012, Shale resource systems for oil and gas: Part 2—Shale-oil resource systems, in J. A. Breyer, ed., Shale reservoirs—Giant resources for the 21st century: AAPG Memoir 97, p. 89-119.

Kausik, R., Fellah, K., Rylander E., Singer P.M., Lewis R.E., Sinclair S.M., "NMR Petrophysics for Tight-Oil Shale Enabled by Core Re-Saturation", Society of Core Analysts, SCA 2014-28, 2014 (6 pages).

* cited by examiner

QUALITY METRICS FOR TIGHT OIL RESERVOIRS

REFERENCE TO RELATED APPLICATIONS

This patent application claims the benefit of and incorporates by reference each of the following applications:
U.S. Prov. Ser. No. 61/885,705, filed on Oct. 2, 2013;
U.S. Prov. Ser. No. 61/885,718, filed on Oct. 2, 2013; and
U.S. Prov. Ser. No. 61/994,177, filed on May 16, 2014.

FIELD

The subject disclosure generally relates to characterizing hydrocarbon bearing reservoirs. More particularly, the disclosure relates to techniques for defining, calculating and applying quality metric indices for tight oil reservoirs.

BACKGROUND

Traditionally, high abundance of Total Organic Carbon (TOC)—comprising kerogen, bitumen, and mobile hydrocarbons—is considered good for reservoir quality. However, in tight oil plays, kerogen can trap oil by sorption, rendering it non-producible; and highly viscous bitumen can clog pore throats, reducing both permeability and the produced oil fraction. Therefore, it is often not practical to use a reservoir quality metric that is based on the TOC alone. Recently, there have been efforts to use pyrolysis techniques such as Rock-Eval on core and/or cutting samples to measure quantities of light hydrocarbons in tight oil reservoirs (S1) and to use such measurements of S1 to characterize reservoir quality. The Oil Saturation Index (OSI) is defined as S1/TOC×100 as measured by Rock-Eval (mark of Vinci Technologies SA) pyrolysis on core or cutting samples. See, Jarvie, D. M., 2012, Shale resource systems for oil and gas: Part 2—Shale-oil resource systems, in J. A. Breyer, ed., Shale reservoirs—Giant resources for the 21st century: AAPG Memoir 97, p. 89-119".

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to some embodiments, a method is described for calculating values indicating quality of a hydrocarbon-bearing reservoir formation penetrated by a borehole. The method includes: receiving reservoir log measurement data acquired from logging measurements made in situ at a plurality of depths within the borehole of the formation; for each of the plurality of depths, calculating a light hydrocarbon value based at least in part on the reservoir log measurement data at that depth, the light hydrocarbon value indicating quantity of light hydrocarbon at that depth; and for each depth, calculating a quantitative reservoir quality value indicating potential for producing hydrocarbons from the formation at that depth, wherein each of the calculated reservoir quality values is based at least in part on the calculated light hydrocarbon value at that depth.

According to some embodiments, the method also includes calculating an organic carbon value based at least in part on the reservoir log measurements at each depth, wherein the quantitative reservoir quality value is positively correlated with the calculated light hydrocarbon value and negatively correlated with the calculated organic carbon value (which can be e.g. total organic carbon, or a sum of kerogen and bitumen). According to some embodiments, the reservoir log measurements include geochemical logging measurements and magnetic resonance measurements, and the total organic carbon value is calculated from the geochemical logging measurements. According to some embodiments, the quantitative reservoir quality value can be defined as having a linear relationship with light hydrocarbon. According to some other embodiments, the quantitative reservoir quality value can be defined as having a non-linear relationship with light hydrocarbon. For example, the quantitative reservoir quality value can be defined to be proportional to the light hydrocarbon value squared and inversely proportional to the total organic carbon value (or sum of kerogen and bitumen quantities).

According to some embodiments the logging measurements include logging measurements made using a magnetic resonance downhole tool, and the light hydrocarbon value is calculated at least in part by removing contributions from bitumen and subtracting a water volume. According to some other embodiments the logging measurements include logging measurements made using a magnetic resonance downhole tool capable of measuring diffusion, and the light hydrocarbon value is calculated using diffusion and $T_2$ measurements from the magnetic resonance downhole tool.

According to some embodiments, a system is described for calculating values indicating quality of a hydrocarbon-bearing reservoir formation penetrated by a borehole. The system includes a processing system configured to receive reservoir log measurement data acquired from logging measurements made in situ at a plurality of depths within the borehole of the formation, to calculate, for each depth, a light hydrocarbon value based at least in part on the reservoir log measurement data, the light hydrocarbon value indicating quantity of light hydrocarbon at that depth, and to calculate a quantitative reservoir quality value indicating potential for producing hydrocarbons from the formation at that depth, wherein each of the calculated reservoir quality value is based at least in part on the calculated light hydrocarbon value at that depth.

According to some embodiments, a method is described for calculating values indicating quality of a hydrocarbon-bearing reservoir formation. The method includes calculating a quantitative reservoir quality value by nonlinearly combining a measure indicating light hydrocarbons in the formation and a measure indicating organic carbon in the formation. According to some embodiments, the measure indicating light hydrocarbons is a weight fraction of carbon in light hydrocarbon in the formation, and the measure indicating organic carbon is a weight fraction of total organic carbon content in the formation including kerogen, bitumen and light hydrocarbon. According to some other embodiments the measure indicating organic carbon is a weight fraction of a sum of organic content in the formation of kerogen and bitumen.

According to some embodiments, the measure indicating light hydrocarbons and the measure indicating organic carbon are based on measurements of a rock sample (e.g. core or cuttings) of the formation made in a surface facility. According to some embodiments, the measurements of the rock sample in the surface facility includes pyrolysis measurements on the rock sample, and the measure indicating light hydrocarbons is an S1 peak from the pyrolysis measurements. According to some other embodiments, the measure indicating light hydrocarbons and the measure indicating organic carbon are based on reservoir log measurement data acquired from logging measurements made in situ at a plurality of depths within the borehole of the formation.

Further features and advantages of the subject disclosure will become more readily apparent from the following detailed description when taken in conjunction with the accompanying drawings.

BRIEF DESCRIPTION OF THE DRAWINGS

To further clarify the above and other advantages and features of the subject matter of this patent specification, specific examples of embodiments thereof are illustrated in the appended drawings. It should be appreciated that these drawings depict only illustrative embodiments, and are therefore not to be considered limiting of the scope of this patent specification or the appended claims. The subject matter hereof will be described and explained with additional specificity and detail through the use of the accompanying drawings in which:

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

Shortcomings of the known OSI (S1×100/TOC measured by pyrolysis) include the fact that it does not provide comparative reservoir quality indices for different zones having similar OSI values. Two intervals, one with a high S1 and TOC content and another with a low S1 and TOC could have the same OSI value. This makes the application of the absolute value of OSI insufficient to determine the Reservoir Quality of such wells. Another drawback with the conventional OSI based on Rock-Eval is that the bitumen peak can end up being distributed over both S1 and S2, thereby complicating the interpretation. In particular, it is problematic if S1 includes both: (1) light oil, which is positively associated with reservoir quality; and (2) a significant amount of bitumen, which is negatively associated with reservoir quality. Another problem with the known OSI is that a large fraction of the producible oil and gas typically escapes core and/or cuttings during the process of bringing the samples to the surface. This fluid loss makes Rock-Eval pyrolysis measurements unrepresentative of the subsurface formation.

According to some embodiments, techniques are described by which known metrics such as OSI, as well as novel metrics for reservoir quality, can be measured as continuous logs in subsurface formations using combinations of logging techniques such as nuclear magnetic resonance (NMR), geochemical spectroscopy logging methods, and other logging techniques like dielectric or resistivity logging.

Figure 1:
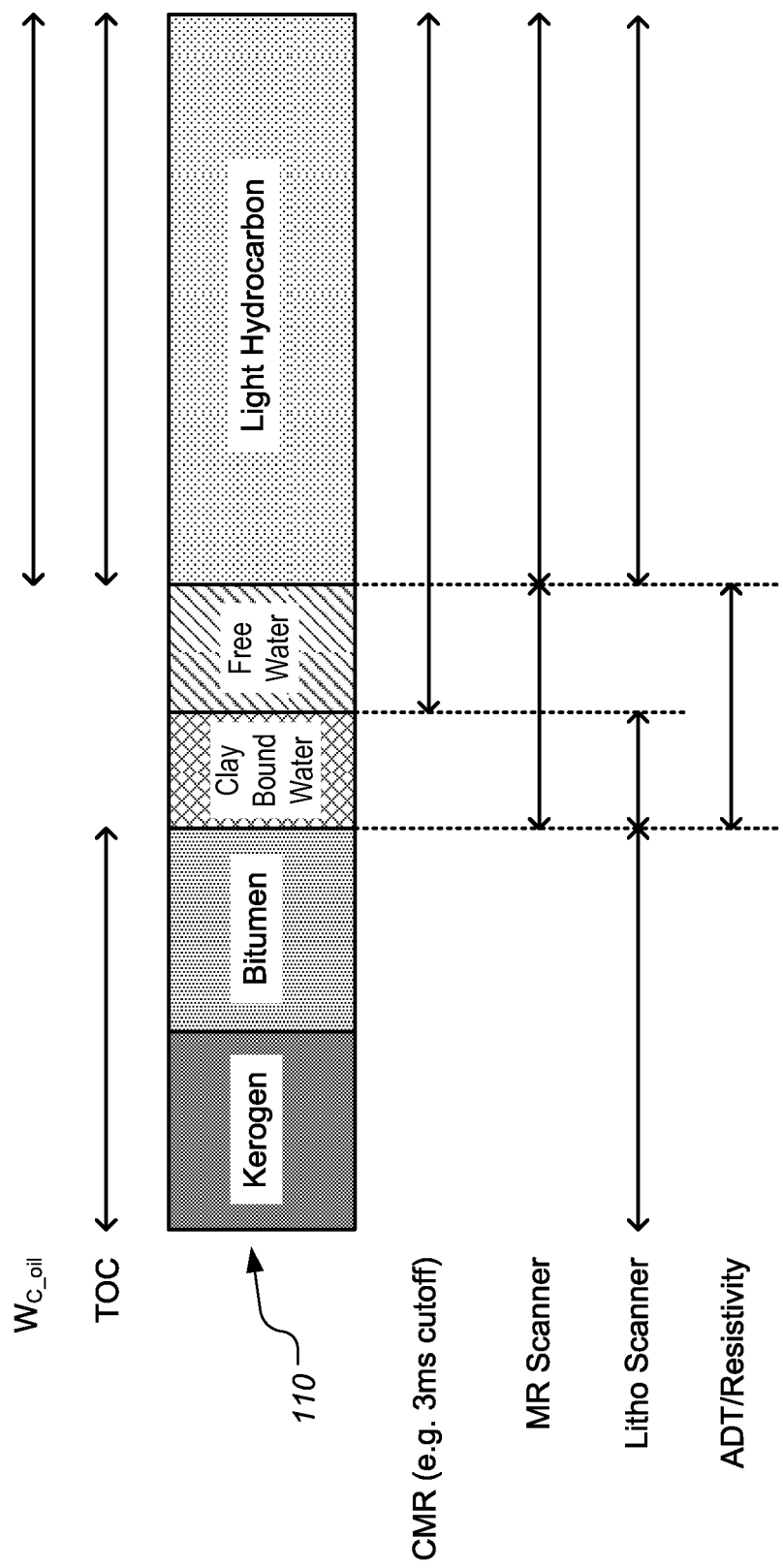
FIG. 1 illustrates a petrophysical model for tight oil reservoirs and a response of various logging tools to the different constituents, according to some embodiments.

According to some embodiments a new metric for reservoir quality in tight oil plays, the Carbon Saturation Index (CSI), is calculated based primarily on logging tools and circumvents many of the problems associated with the recovery and analysis of cuttings and/or cores. The Carbon Saturation Index is defined as:

$$\mathrm{CSI} = W_{C\_oil}\mathrm{TOC}, \quad (1)$$

where $W_{C\_oil}$ is the weight fraction of carbon in the formation associated with light hydrocarbon with units of grams organic carbon per gram formation, and TOC is the total organic carbon content comprising kerogen, bitumen, and light hydrocarbon with units of grams organic carbon per gram formation. As both numerator and denominator have the same units, CSI is a fractional number ranging from 0 to 1. FIG. 1 illustrates a petrophysical model for tight oil reservoirs and a response of various logging tools to the different constituents, according to some embodiments. The model 110 shows constituent of a tight oil reservoir. Above the model shows that $W_{C\_oil}$ includes organic carbon in light oil (both bound and movable), while TOC includes organic carbon in light oil as well as kerogen and bitumen. The weight fraction of carbon associated with light oil, $W_{C\_oil}$, is computed as the weight fraction of light oil in the formation, $W_{C\_oil}$, multiplied by the fractional weight of carbon in oil, which is typically 0.82-0.86 grams C per gram oil. Below the model are various Schlumberger logging tools showing to which constituents each tool is responsive. Note that although Schlumberger logging tools are shown in FIG. 1 for illustrative purposes, according to some embodiments other logging tools are used instead of Schlumberger tools. Note further that although the CMR tool a cutoff of 3 ms is shown for illustrative purposes other cutoff values can be used. For example cutoff values of 2.9 ms or 3.1 ms can be used and in general the value will typically be between 0 and several milliseconds.

In tight oil plays, a fraction of the light hydrocarbon is producible while nearly all of the bitumen and all of the kerogen is left behind. Additionally, the bitumen can clog pore throats and the kerogen can absorb oil and swell, resulting in decreased production and thereby acting as negative reservoir quality indicators. It is important to note that the $W_{C\_oil}$ of CSI includes only the light oil fraction and is defined differently to that of the Rock-Eval based OSI, which includes light oil plus bitumen fraction in S1. Furthermore, the Rock-Eval sensitivity to oil is uncertain since some oil disappears during transport to the surface, and the Rock-Eval sensitivity to bitumen is uncertain because bitumen is spread over S1 and S2. Therefore CSI accounts for the positive reservoir quality characteristics of the producible hydrocarbon and the negative reservoir quality characteristics of kerogen and bitumen. Consequently, CSI is superior to OSI for indicating reservoir quality in tight oil plays.

CSI relies on a measurement of the oil concentration, and the sum of oil plus bitumen plus kerogen concentrations (i.e., TOC). According to some embodiments, these variables can be acquired from a combination of magnetic resonance logging tools (e.g. Schlumberger's MR Scanner, or Combinable Magnetic Resonance (CMR) tools), elemental spectroscopy tools (e.g. Schlumberger's Litho Scanner, or Elemental Capture Spectroscopy Sonde (ECS) plus Reservoir Saturation Tool (RST)) and in some cases dielectric dispersion (e.g. Schlumberger's Dielectric Scanner) logs.

According to some embodiments, a magnetic resonance tool (such as Schlumberger's MR Scanner) is used to quantify the volume fraction of light oil from $D\text{-}T_1$ or $D\text{-}T_2$ maps by enabling its separation from other free fluids like water. Accurate quantification of light oil by the MR Scanner can be enabled by the long relaxation times of the oil. From $D\text{-}T_1$ or $D\text{-}T_2$ maps, the volume of the light oil can be calculated. TOC can be obtained as a continuous log using a spectroscopy tool such as Schlumberger's Litho Scanner high-definition spectroscopy tool, which measures the dry-weight mass fraction of organic carbon from all hydrocarbons (oil, kerogen, and bitumen). See Gonzalez et al., "Determination of Formation Organic Carbon content using a new Neutron Induced Gamma Ray Spectroscopy Service that directly measures carbon," SPWLA 54$^{th}$ Annual Logging Symposium, Jun. 22-26, 2013, which is incorporated herein by reference. A continuous OSI-like index, (which we can refer to as $OSI_{log}$) can be created based on data from tools such as the MR Scanner and Litho Scanner. According to some embodiments, to compute $OSI_{log}$, $V_{oil}$ from the logs can be converted to $W_{oil}$ using a known oil density value. For CSI, $W_{C\_oil}$ can be computed using an estimated fractional weight of carbon in oil.

The $OSI_{log}$ (and also CSI) takes into account both the positive reservoir quality characteristics of the oil as well as the negative reservoir quality effects of kerogen and bitumen. A limitation of the CSI and $OSI_{log}$ is that they do not distinguish universally between rich and lean intervals. Two intervals, one with a high $W_{C\_oil}$ (or S1) and high TOC content and another with a very low $W_{C\_oil}$ (or S1) and very low TOC, could have the same CSI (or OSI) value, although the interval with low $W_{C\_oil}$ (or S1) would not be expected to produce significant amounts of oil. This makes CSI and OSI less useful for distinguishing the reservoir quality of such intervals. According to some embodiments, further insights are provided to reservoir producibility by introducing an improved reservoir quality metric, the Reservoir Producibility Index (RPI).

$$RPI = W_{C\_oil} \times CSI \qquad (2)$$

By combining $W_{C\_oil}$ and CSI, RPI differentiates zones with similar CSI. RPI can be measured by the same Schlumberger tools used for determining CSI.

The produced hydrocarbon from the well can be approximated as the difference in the movable light hydrocarbon between the log and core measurements. From studies of the correlation of RPI with the produced hydrocarbon, RPI has been found to be statistically almost a factor of two better than the correlation using OSI or S1 individually. According to some embodiments, a metric similar to RPI (e.g. S1×OSI) can also be applied on cores or cuttings. Preserved samples give better estimations of the S1 and therefore provide better results for such metrics.

Equation (2) can be restated to $RPI = W_{C\_oil}^2 100/TOC$. According to some embodiments, other non-linear relationships of $W_{C\_oil}$ and TOC can be used. For example RPI in general can be defined as $RPI = A \times W_{C\_oil}^{\alpha}/TOC^{\beta}$ where $A=100$, $\alpha=2$ and $\beta=1$. However other non-linear relationships between $W_{C\_oil}$ and TOC may also be useful for predicting reservoir quality. According to some embodiments, correlations between produced hydrocarbon and various values of $\alpha$ and $\beta$ can be used to define other useful metrics for reservoir quality. In general, if $\alpha > \beta$, then the RPI can favorably distinguish a high $W_{C\_oil}$–high TOC locations from low $W_{C\_oil}$–low TOC locations. According to some embodiments, RPI can alternatively be defined in other units, such as those of volumes instead of the weights as shown above.

The techniques described herein can be generalized to any subsurface formation where the hydrocarbon is present as gas, oil, condensates or any combinations. According to some embodiments, other reservoir quality metrics can be obtained by the permutation of OSI, S1, and/or $W_{C\_oil}$ in algebraic form, graphical form, or other form. Following are a few possibilities:

(1) $W_{C\_oil} \times (W_{C\_oil}/TOC) \times A$ (where A can be any number. Traditionally 100 is used.)
(2) $W_{C\_oil} + [(W_{C\_oil}/TOC) \times 100]$.
(3) $W_{C\_oil} - TOC$
(4) $(B \times W_{C\_oil}) - TOC$, where B is adjustable
(5) $W_{C\_oil} - (C \times TOC)$, where C is adjustable
(6) $W_{C\_oil}$ track colored according to CSI
(7) CSI track colored by $W_{C\_oil}$
(8) $W_{C\_oil}^{\alpha}/TOC^{\beta}$ where $\alpha \neq \beta$ (e.g. $\alpha > \beta$)
(9) $W_{C\_oil}/(TOC - W_{C\_oil})$
(10) $W_{C\_oil}^2/(TOC - W_{C\_oil})$
(11) $CSI_K = (W_{C\_oil}/K) \times 100$, where K is the weight fraction of kerogen.

According to some embodiments, each of the above examples can also substitute S1 for $W_{C\_oil}$.

According to some embodiments, in some cases the $T_2$ distribution above a value such as 3 ms can be used to quantify the light oil and the free water contributions. This is because the other components of the $T_2$ distribution, namely the bitumen and the clay bound water, have relaxation times less than that value. The amount of clay bound water can be estimated as a percentage of the weight of the clay content determined using tools such as Schlumberger's Litho Scanner. The total water which includes the clay bound water and the free water can be determined using dielectric dispersion logging tools such as Schlumberger's Dielectric Scanner tool. The quantity of light oil can be calculated from the difference between NMR $T_2$ distributions above the value (e.g. 3 ms) and the free-water volume derived from the Litho Scanner and Dielectric Scanner measurements. The TOC can be measured using the Litho Scanner as described supra. Therefore, CSI and RPI can be calculated using the light oil and TOC quantities with eqs. (1) and (2).

Typically in tight oil plays, the movable oil is lost while bringing the cores or cuttings to the surface. This implies that the difference between the light oil in the log versus in the core can be used as a proxy for the producible hydrocarbon from the well. See, e.g.: Rylander E., Singer P. M., Jiang T., Lewis R. E., McLin R., Sinclair S. M., "NMR $T_2$ Distributions in the Eagle Ford Shale: Reflections on Pore Size", SPE, (2013), 164554 and Kausik, R., Fellah, K., Rylander E., Singer P. M., Lewis R. E., Sinclair S. M., "NMR Petrophysics for Tight-Oil Shale Enabled by Core Re-Saturation", Society of Core Analysts, SCA 2014-28, 2014. The correlation of calculated light oil fraction, CSI, RPI or other reservoir quality metric with the produced hydrocarbon can be plotted to determine the efficacy of the metric. In some cases, it was found that the correlation of the produced oil with RPI is twice as good as that from CSI or $W_{C\_oil}$ individually.

Figure 2:
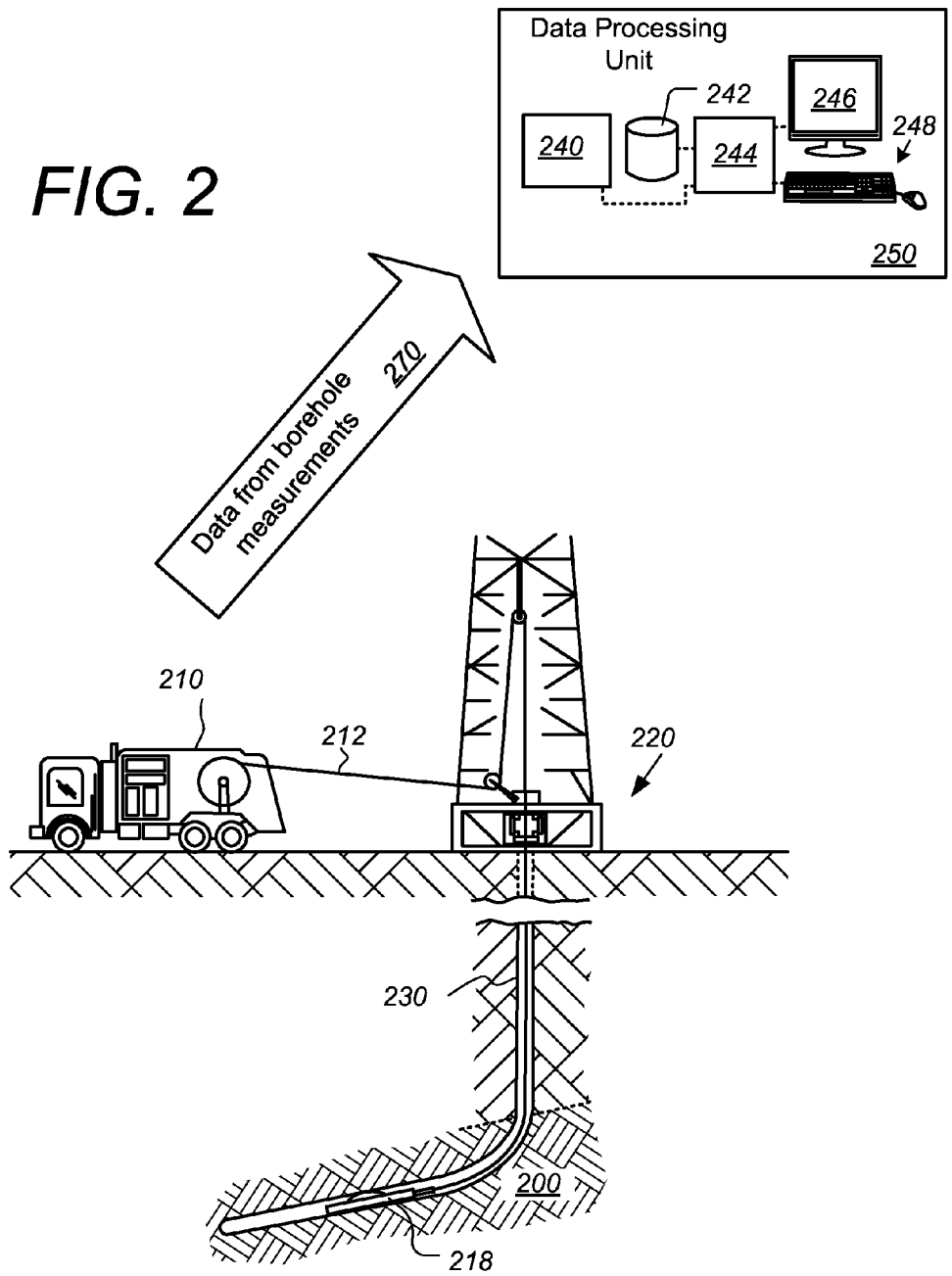
FIG. 2 is a diagram showing a wireline tool being deployed in a wellbore penetrating a tight oil reservoir and processing unit for determining reservoir quality metrics, according to some embodiments.

FIG. 2 is a diagram showing a wireline tool being deployed in a wellbore penetrating a tight oil reservoir and processing unit for determining reservoir quality metrics, according to some embodiments. Wireline truck 210 is deploying wireline cable 212 into well 230 via wellsite 220. Wireline tool 218 is disposed on the end of the cable 212 in a subterranean rock formation 200. According to some embodiments, formation 200 is a tight oil reservoir rock formation. Although only a single tool 218 is shown for clarity in FIG. 2, any of a number of different types of tools can be deployed in well 230. According to some embodiments, one or more of the following types of Schlumberger logging tools can be used to quantify the light oil in the formation 200: MR Scanner; CMR+Dielectric Scanner+ Litho Scanner; and CMR+Resistivity+Litho Scanner. According to some embodiments, one or more of the following types of logging tools can be used to quantify the TOC in the formation 200: Schlumberger's Litho Scanner; Schlumberger's ECS and RST; density tools; and gamma ray tools. According to some embodiments, other types of tools, including LWD tools, can be deployed in well 230 to gather information from which light oil, TOC, and/or other parameters (such as kerogen and bitumen) can be determined, which in turn can be used in calculating metrics for characterizing reservoir quality. Data from the tool 218 from rock formation 200 are retrieved at the surface in logging truck 210. From the downhole measurements, data 270 is generated from which TOC and/or light oil can be determined. According to some embodiments, reservoir quality metrics such as described herein (e.g. OSI, CSI, RPI, etc) are determined in processing facility 250, which can be located in the logging truck 210 or at some other location at wellsite 220. According to some embodiments, data processing unit 250 is located at one or more locations remote from the wellsite 220. The processing unit 250 preferably includes one or more central processing units 244, storage system 242, communications and input/output modules 240, a user display 246 and a user input system 248. According to some embodiments, light oil and TOC quantities are calculated for multiple depths in close proximity so as to generate a continuous log for the desired reservoir quality metric(s) (e.g. CSI or RPI).

According to some embodiments, the techniques described herein with respect to using data from wireline deployed logging tools are also applicable to data from tools deployed using other technologies.

Figure 3A:
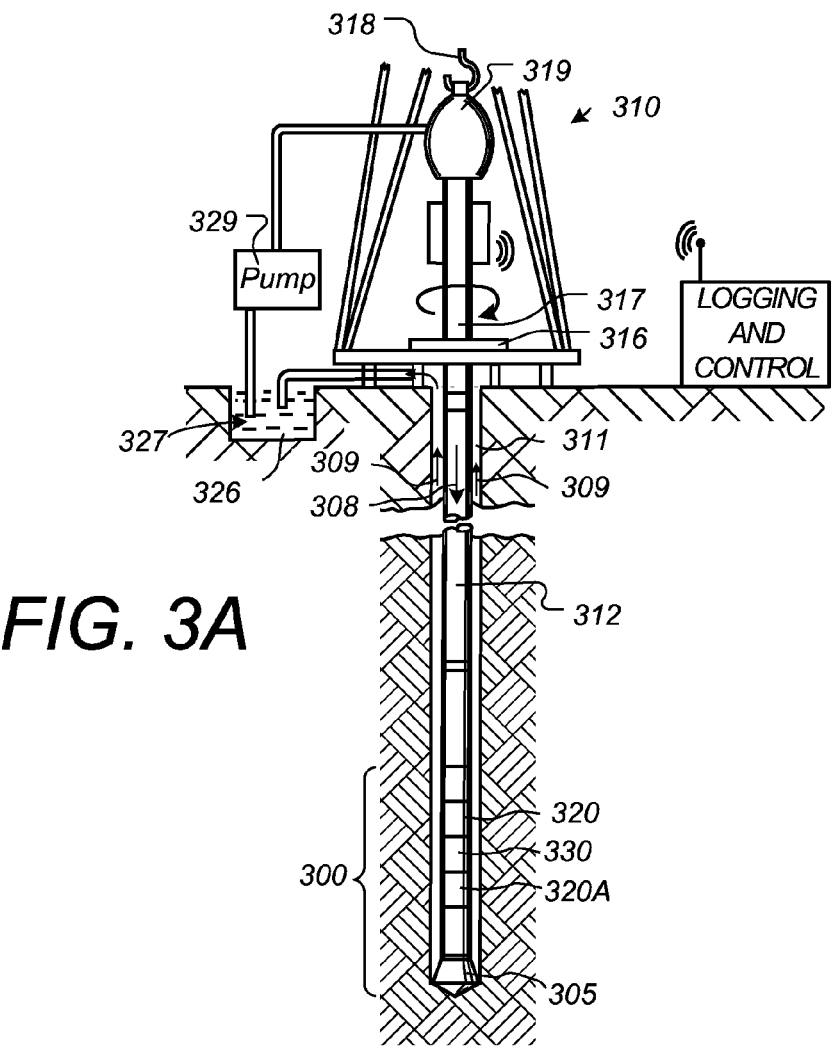
FIG. 3A is a diagram wellsite system in which reservoir quality metrics can be determined based on borehole measurements made during a drilling operation, according to some embodiments.

FIG. 3A is a diagram wellsite system in which reservoir quality metrics can be determined based on borehole measurements made during a drilling operation, according to some embodiments. The wellsite can be onshore or offshore. In this exemplary system, a borehole 311 is formed in subsurface formations by rotary drilling in a manner that is well known. Embodiments of the invention can also use directional drilling, as will be described hereinafter.

A drill string 312 is suspended within the borehole 311 and has a bottom hole assembly 300 that includes a drill bit 305 at its lower end. The surface system includes platform and derrick assembly 310 positioned over the borehole 311, the assembly 310 includes a rotary table 316, kelly 317, hook 318 and rotary swivel 319. The drill string 312 is rotated by the rotary table 316, energized by means not shown, which engages the kelly 317 at the upper end of the drill string. The drill string 312 is suspended from a hook 318, attached to a traveling block (also not shown), through the kelly 317 and a rotary swivel 319, which permits rotation of the drill string relative to the hook. As is well known, a top drive system could alternatively be used.

In the example of this embodiment, the surface system further includes drilling fluid or mud 326, stored in a pit 327 formed at the well site. A pump 329 delivers the drilling fluid 326 to the interior of the drill string 312 via a port in the swivel 319, causing the drilling fluid to flow downwardly through the drill string 312, as indicated by the directional arrow 308. The drilling fluid exits the drill string 312 via ports in the drill bit 305, and then circulates upwardly through the annulus region between the outside of the drill string and the wall of the borehole, as indicated by the directional arrows 309. In this well-known manner, the drilling fluid lubricates the drill bit 305 and carries formation cuttings up to the surface as it is returned to the pit 327 for recirculation.

The bottom hole assembly 300 of the illustrated embodiment contains a logging-while-drilling (LWD) module 320, a measuring-while-drilling (MWD) module 330, a rotosteerable system and motor, and drill bit 305.

The LWD module 320 is housed in a special type of drill collar, as is known in the art, and can contain one or a plurality of known types of logging tools. It will also be understood that more than one LWD and/or MWD module can be employed, e.g. as represented at 320A. (References throughout, to a module at the position of 320, can alternatively mean a module at the position of 320A as well.) The LWD module includes capabilities for measuring, processing, and storing information, as well as for communicating with the surface equipment. In the present embodiment, the LWD module includes a resistivity measuring device as well as a number of other devices, such as a neutron-density measuring device.

The MWD module 330 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

According to some embodiments, data from the LWD and/or MWD modules are used to determine quantities of light oil and/or TOC for use in calculating the desired metric(s) for reservoir quality as is described herein with respect to wireline tool measurements. Examples of LWD tools that could be used include density, gamma ray, resistivity and geochemistry (e.g. measured using Schlumberger's EcoScope multifunction LWD service, as well as NMR such as measured by Schlumberger's provision LWD service.

Figure 3B:
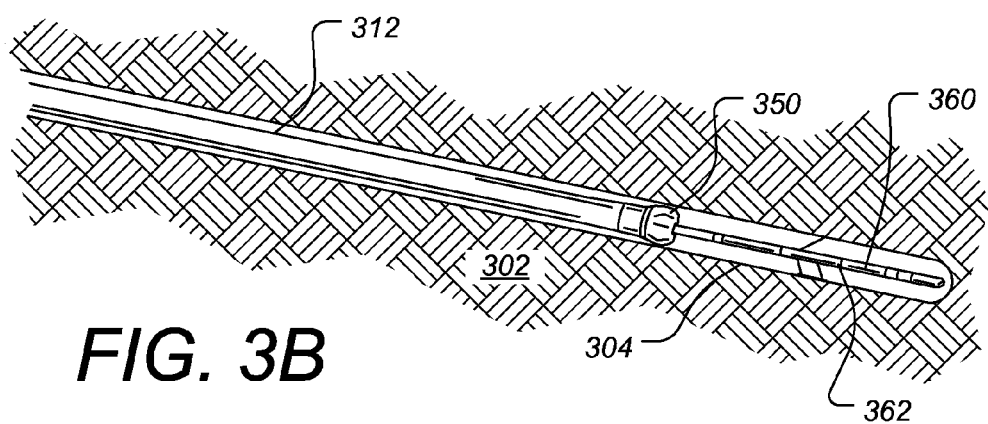
FIG. 3B illustrates an example of reservoir quality calculated using data gathered with through-the-bit deployed logging tools, according to some embodiments.

According to some embodiments, the techniques described herein are also applicable to data gathered using through-the-bit deployed logging tools, such as Schlumberger's ThruBit conveyance platform. FIG. 3B illustrates an example of reservoir quality calculated using data gathered with through-the-bit deployed logging tools, according to some embodiments. Shown in this case is portal pass-through bit 350 that has been used to ream to the target depth to prepare the borehole 304 for logging data from formation 302. The toolstring 360 is pushed through a central opening in portal bit 350 and logging tools such as tool 362 takes measurements as the pipe 312 is tripped out of the well 304. Once logging is complete, the portal bit 350 at the end of drillpipe 312 and toolstring 360 are pulled up into the casing. A retrieval tool is lowered on a wireline to latch on the toolstring 360 and return it to the surface. With the logging toolstring 360 recovered, drilling or other operations can resume while the logging data is analyzed and the desired reservoir quality metric(s) are generated.

Although, as discussed, the metric CSI has advantages over the known OSI metric, according to some embodiments, OSI can also be calculated as a continuous log based on wellbore-measured logging data rather than based on surface-measured pyrolysis data. In order to calculate OSI, a determination is made of the S1 and TOC (kerogen+bitumen+oil) concentration in the formation. The oil concentration is analogous to the S1 used in Rock Eval (also referred to as "$S1_{core}$"), and is hereafter for log interpretations referred to as "$S1_{log}$". The oil plus bitumen plus kerogen concentrations are analogous to the TOC used in Rock Eval (also referred to herein as "$TOC_{core}$") and is hereafter for log interpretations also referred to as "$TOC_{log}$". According to some embodiments, OSI determined from logging data can be defined in volume units which in some cases is more directly relevant for petrophysical applications, than the mass units which are commonly used for OSI when determined from Rock Eval measurements. Note that $S1_{log}$ is closely related but not identical to $W_{C\_oil}$. Both are measures of light hydrocarbon in the formation based on downhole measurements, but $S1_{log}$ is the weight fraction of light oil in the formation rock, whereas $W_{C\_oil}$ is the weight of carbon associated with light oil in formation. To convert between $S1_{log}$ and $W_{C\_oil}$ an estimated fractional weight of carbon in oil can be used.

According to some embodiments, methods are disclosed for measurement of $TOC_{log}$. The method includes determining the total organic carbon content of a subsurface formation as a continuous log using a geochemical spectroscopy logging method, e.g., U.S. Pat. No. 4,686,364, entitled, "In situ determination of total carbon and evaluation of source rock therefrom," the contents of which are herein incorporated by reference. This quantity is the mass fraction of organic carbon from all hydrocarbons at every depth in the formation, which would include any and all oil, bitumen, and kerogen. It should be noted that the inorganic contributions to the continuous total carbon log, for example from carbonate minerals, is explicitly accounted for in spectroscopy analysis enabling a robust determination of the organic-associated carbon (i.e., $TOC_{log}$).

According to some embodiments, methods are disclosed for measurement of $S1_{log}$ and/or $W_{C\_oil}$. A magnetic resonance log measurement is made at every depth. The magnetic resonance porosity includes the bound and free water, oil and a part of the bitumen signal. The bitumen signal would show up in only the first few echoes as it has short relaxation times. With an upper cutoff (e.g., of about 750 μs) this can be subtracted from the NMR porosity to obtain only the oil plus water contributions. To determine the water-filled porosity other measurements such as resistivity or dielectric logs can be used (see FIG. 1). The NMR porosity excluding bitumen and minus the water-filled porosity (from dielectric, resistivity, or the like) provides an estimate of the oil-filled porosity. Knowing the density of the oil, it is possible to determine the oil concentration as a mass fraction, which is the $S1_{log}$. Using an estimated fractional weight of carbon in oil it is possible to determine $W_{C\_oil}$. According to some embodiments, other advanced NMR techniques like $T_1/T_2$ and $D-T_2$ (or $T_1$) can also be applied to separate the hydrocarbon from the water and therefore obtain oil volumes, and thus S1 and/or $W_{C\_oil}$.

Figure 4:
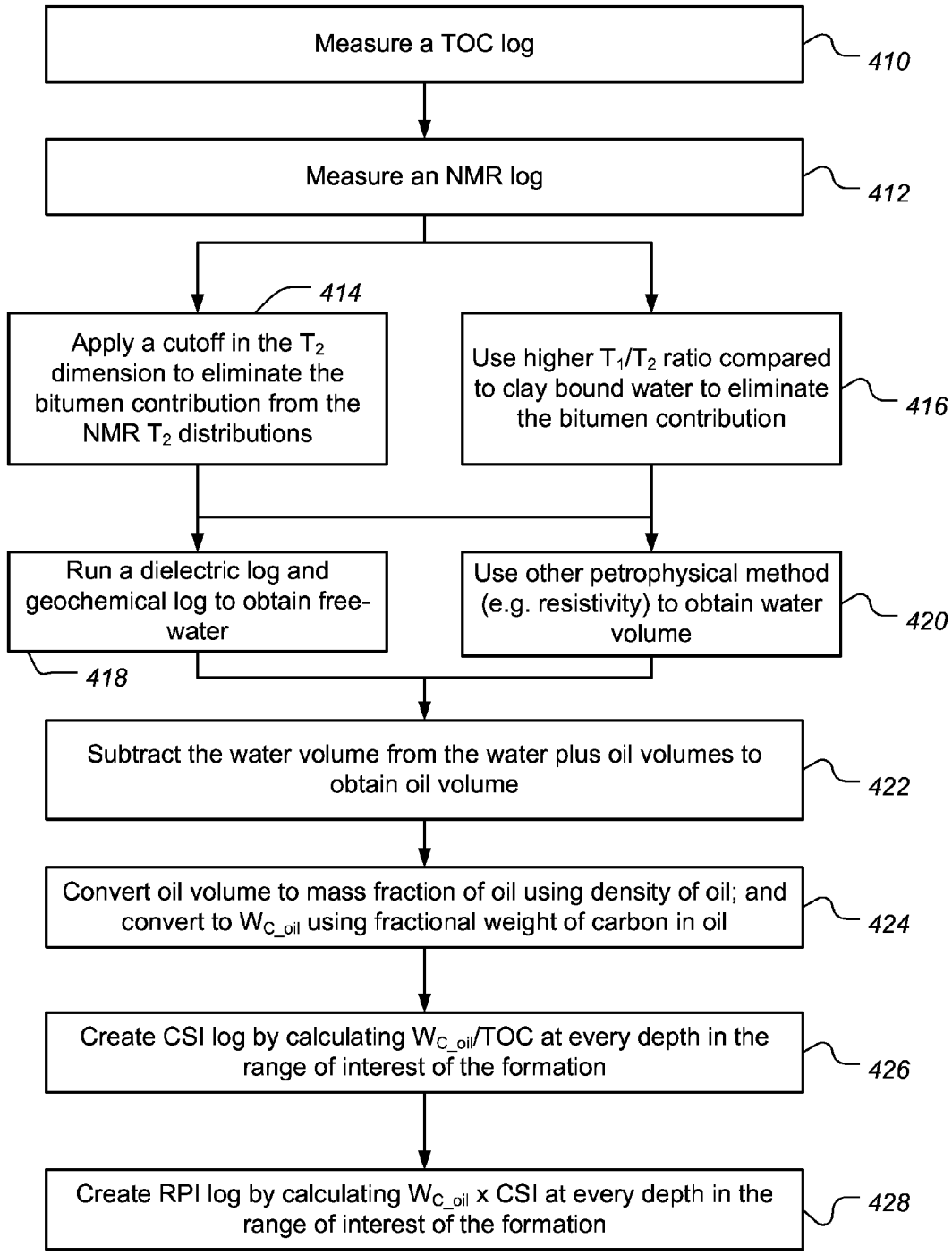
FIG. 4 is a flow chart illustrating aspects of a method for determining reservoir quality metrics, such as CSI and RPI, from logging data, according to some embodiments.

FIG. 4 is a flow chart illustrating aspects of a method for determining reservoir quality metrics, such as CSI and RPI, from logging data, according to some embodiments. In block 410 a TOC log is measured using any applicable geochemical spectroscopy tool, such as a pulsed neutron sonde. In block 412, an NMR log is measured using, for example, the Schlumberger CMR® tool. The TCMR volume includes the contributions from water (free and bound), oil (free and kerogen bound) and a fraction of the bitumen. As the kerogen is solid, it is invisible to the NMR log. Bitumen is characterized by very short $T_2$ relaxation times and its tail can extend into the NMR visible $T_2$ spectrum. Therefore, in block 414, by applying a cutoff in the $T_2$ dimension (for example at approximately 750 μs), the bitumen contribution can be eliminated from the NMR $T_2$ distributions. The TCMR volume then includes only a contribution from water plus oil. Bitumen has a higher $T_1/T_2$ ratio compared to clay bound water (e.g. 5 to 15 versus 1.8 to 3) and therefore this ratio can also be used alternatively to eliminate the bitumen contribution to the NMR signal in block 416. In block 418 a dielectric log is run to obtain the water-filled porosity (water volume). Alternatively, in block 420, another petrophysical method and combinations thereof as known to those skilled in the art can also be used to obtain water volumes, e.g., resistivity etc. In block 422, the water-filled porosity (water volume) is subtracted from the oil plus water volumes obtained from TCMR. The amount of clay bound water can be estimated as a percentage of the weight of the clay content determined using tools such as Schlumberger's Litho Scanner (which may have been run, e.g. in block 410). The total water which includes the clay bound water and the free water can be determined using dielectric dispersion logging tools such as Schlumberger's Dielectric Scanner tool. After subtracting the free water, the result is the oil volume. In block 424, oil volumes can be converted into $S1_{log}$ (mass fraction of oil) using the density of the oil. The density of oil is typically well known in a given reservoir from "local knowledge," for example from adjacent wells, from production or stock tank analyses. In addition, most tight oil drilling is concentrated in reservoirs where the oil has low viscosity and is light. The mass fraction of oil, $S1_{log}$, is analogous to S1 measured by Rock Eval, except that it can be a better indicator of reservoir quality since it does not include bitumen and also is measured in situ. Using an estimated fractional weight of carbon in oil, the value of $W_{C\_oil}$ can be calculated. In block 426, a CSI log is created by calculating the value from $(W_{C\_oil})/TOC_{log}$ at every depth in the formation. The CSI log can be presented as standard in mass units, or alternatively in volumetric units, which are readily interchangeable by using density conversions. In block 428, the reservoir quality metric RPI can be calculated using $RPI = W_{C\_oil} \times CSI$.

According to some other embodiments, alternatives to the above logging methods are used to obtain $S1_{log}$ or $W_{C\_oil}$ and $TOC_{log}$. For example, density and NMR can be used in combination to obtain kerogen plus bitumen volumes. $TOC_{log}$ is then computed as the sum of oil (i.e., from $S1_{log}$ as computed, supra) and of the kerogen plus bitumen volumes. In another example, a nuclear density log is obtained. The difference between the total pore volume (kerogen+ bitumen+oil+water) from density and the water-filled porosity from dielectric is the volume of all organic components. According to some embodiments, CSI can be computed in volumetric units using $S1_{log}$ or $W_{C\_oil}$ obtained from NMR (also in volumetric units) and the sum volume of all organic components. Alternatively, CSI can be computed in mass units, using appropriate density conversions.

Advantages of techniques such as those described herein using in-situ borehole logging measurements instead of pyrolysis on core/cutting samples include but are not limited to: (1) compared to cuttings-based measurements of OSI which work only in water-based mud, these methods work for any mud type; (2) compared to cuttings-based measurements of OSI which fail to identify pay in the case that oil is expelled from the cuttings as a result of the pressure drop, these logs are acquired without the formation experiencing a pressure drop, making expulsion much less likely and therefore making it less likely that this method will miss pay; (3) compared to other methods involving log-core comparisons, this method need not rely upon relatively expensive coring; (4) these methods have much greater depth resolution than cuttings-based methods, which is especially significant for vertical wells; (5) compared to cuttings, the depth of investigation of these logs is greater than the size of the cuttings. As such, these methods can be less sensitive to drilling fluid invasion; and (6) cutting and core-based techniques suffer from the fact that pyrolysis measured S1 includes a combination of oil and bitumen with unknown weightings, which is unfavorable for measuring reservoir quality since oil is a positive factor and bitumen is a negative factor.

According to some embodiments, petrophysical indices for evaluating the value of tight-oil plays are described. These include a log producibility index (LPI) and a producible oil saturation index (POSI). The log producibility index (LPI) $[S1_{log}-S1_{core}]\times 100/S1_{log}$ is a direct measure of the producible fraction of the total S1. The producible oil saturation index (POSI) is given by $[S1_{log}-S1_{core}]\times 100/$TOC and is a measure of the producible part of the S1 as a fraction of the total organic content (TOC) which includes all of kerogen, bitumen, and the producible and non-producible part of the S1 hydrocarbons. This definition of TOC may be different than the conventional explanation where TOC includes only the kerogen fraction. The importance of this index is underlined by the fact that kerogen could be a negative reservoir quality indicator in tight oil plays because it sorbs a part of S1 which renders this fraction non-producible. These new indices are applicable to any subsurface formation wherein the appropriate logs are run and geological samples, such as core or cuttings, are recovered.

Figure 5:
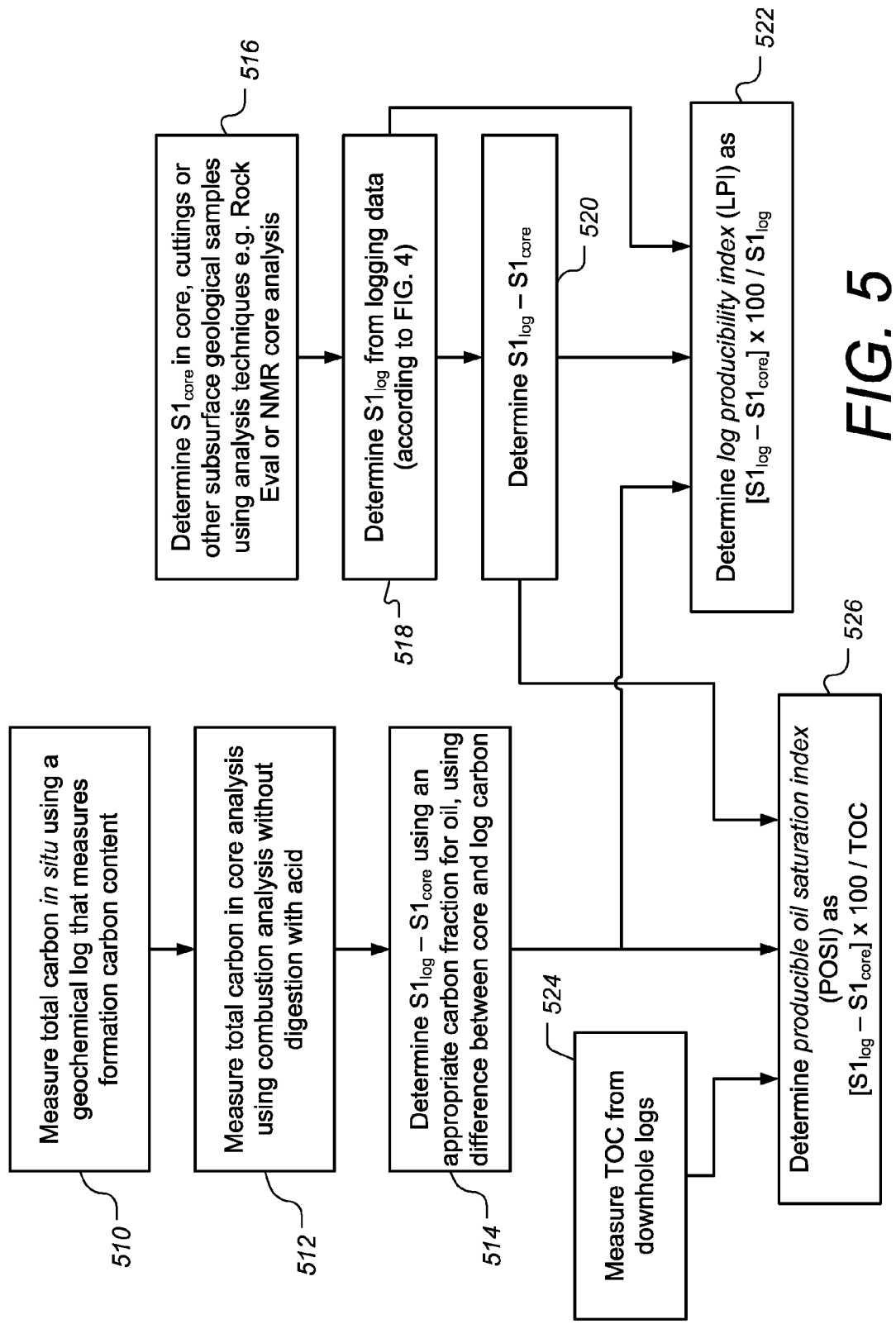
FIG. 5 is a flow chart illustrating aspects of various methods for calculating the log producibility index (LPI) and the producible oil saturation index (POSI), according to some embodiments.

FIG. 5 is a flow chart illustrating aspects of various methods for calculating the log producibility index (LPI) and the producible oil saturation index (POSI), according to some embodiments. In block 510, total carbon is measured in situ using a geochemical log that measures formation carbon content, for example using Schlumberger's Litho Scanner tool. In block 512, total carbon is measured using core analysis for example using combustion analysis (e.g. using equipment from LECO Corp.) without digestion with acid. The difference between core and log carbon can be equated to hydrocarbons (light oil) that have been expelled from the core during extraction. In block 514, this difference can be equated to $S1_{log}$ minus $S1_{core}$ using an appropriate carbon fraction for the oil. The basic premise behind this method is the fact that the part of the TOC that escapes when the cores are brought to the surface is a part of the S1 component. Of the other TOC components, none of the kerogen and at most a small portion of bitumen escapes.

In block 516, $S1_{core}$ is determined from cuttings or other subsurface geological samples. Standard core analysis techniques can be used such as Rock Eval or retort-based techniques. According to some embodiments, NMR core analysis using 1D and 2D NMR techniques can alternatively be used to determine $S1_{core}$.

In block 518, $S1_{log}$ is determined from logging data from various borehole tools, such as described in FIG. 4, supra. In some cases, the bitumen contribution to the $S1_{log}$ value may be difficult to quantify as the $T_2$ cutoff is difficult to know a priori. An alternative method is to equate bitumen quantity (bottom hole compensated from mud retort analysis) to TOC determined by core analysis (e.g. combustion using equipment from LECO Corp.). This generally gives a rigorous linear trend with the slope dependent on maturity and kerogen type. This combustion-analysis-derived bitumen quantity could then be applied after checking for consistency with NMR.

In block 520, $S1_{log}$ minus $S1_{core}$ can be determined from the results of blocks 516 and 518. In block 522, the log producibility index (LPI) is calculated to be $[S1_{log}-S1_{core}]\times 100/S1_{log}$, and an LPI log for the formation can thus be created. Note that either the result in block 514 or the result in block 520 can be used for the numerator of the LPI.

In block 524, the total organic carbon (TOC) is measured downhole. According to some embodiments, one or more of the following techniques are used to calculate the TOC in downhole logs:

1. A geochemical log to measure total carbon in formation. The TOC is this value minus the carbon associated with inorganic minerals. The methodology for estimating the carbon associated with inorganic material is disclosed in Gonzalez et al. 2013. See Gonzalez et al., "Determination of Formation Organic Carbon content using a new Neutron Induced Gamma Ray Spectroscopy Service that directly measures carbon," SPWLA 54th Annual Logging Symposium, Jun. 22-26, 2013. NMR logs from above a lower cutoff (e.g., 700 µs) can be combined with density logs to provide the TOC.

2. A combination of geochemical, density and NMR logs as outlined in Gonzalez et al. 2013. See Gonzalez et al., "Determination of Formation Organic Carbon content using a new Neutron Induced Gamma Ray Spectroscopy Service that directly measures carbon," SPWLA 54th Annual Logging Symposium, Jun. 22-26, 2013, the contents of which are herein incorporated by reference.

3. Any geochemical logging method(s) that are sensitive to carbon can provide an estimate of TOC. See U.S. Pat. No. 4,686,364, entitled "In situ determination of total carbon and evaluation of source rock therefrom," the contents of which are herein incorporated by reference.

In block 526 the POSI is calculated as $[S1_{log}-S1_{core}]\times 100/$TOC. Note that as in the case of calculating the numerator for LPI, either the result in block 514 or the result in block 520 can be used for the numerator of POSI.

It is possible using the log and core techniques described in the subject disclosure to derive other indices diagnostic of tight oil formation properties and oil producibility. In a non-limiting example, this includes the producible hydrocarbon as a fraction of the non-producible hydrocarbon (S1/[kerogen+bitumen+non-producible S1]). This disclosure is not intended to be exhaustive with regard to the mathematical manipulations of the logs and cores obtained by the methods disclosed above. Other mathematical manipulations not described are contemplated by this disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method of calculating values indicating quality of a hydrocarbon-bearing reservoir formation penetrated by a borehole, the method comprising:
    receiving reservoir log measurement data acquired from logging measurements made in situ at a plurality of depths within the borehole of the formation;
    for each of the plurality of depths, calculating a light hydrocarbon value based at least in part on said reservoir log measurement data at that depth, the light hydrocarbon value indicating quantity of light hydrocarbon at that depth; and
    for each of the plurality of depths, calculating a quantitative reservoir quality value indicating potential for producing hydrocarbons from the formation at that depth, wherein each of said calculated reservoir quality values is based at least in part on said calculated light hydrocarbon value at that depth.

2. The method according to claim 1 further comprising:
    for each of the plurality of depths, calculating an organic carbon value based at least in part on said reservoir log measurements at that depth, wherein said quantitative reservoir quality value is positively correlated with said calculated light hydrocarbon value and negatively correlated with said calculated organic carbon value.

3. The method according to claim 2 wherein said organic carbon value is a total organic carbon value that represents a sum of kerogen, bitumen and light hydrocarbon quantities in the formation.

4. The method according to claim 2 wherein said organic carbon value represents a sum of kerogen and bitumen quantities in the formation.

5. The method according to claim 2 wherein said reservoir log measurements include geochemical logging measurements and magnetic resonance measurements, and said organic carbon value is calculated from said geochemical logging measurements.

6. The method according to claim 2 wherein said quantitative reservoir quality value can be defined as having a linear relationship with the light hydrocarbon value.

7. The method according to claim 6 wherein said quantitative reservoir quality value is proportional to a ratio of said light hydrocarbon value to said organic carbon value.

8. The method according to claim 2 wherein said quantitative reservoir quality value can be defined as having a non-linear relationship with either the light hydrocarbon value or the organic carbon value.

9. The method according to claim 8 wherein said quantitative reservoir quality value is proportional to a ratio of said light hydrocarbon value squared over said organic carbon value.

10. The method according to claim 1 further comprising for each of the plurality of depths, calculating a kerogen value based at least in part on said reservoir log measurements at that depth, wherein said quantitative reservoir quality value is positively correlated with said calculated light hydrocarbon value and negatively correlated with said calculated kerogen value.

11. The method according to claim 1 further comprising for each of the plurality of depths, calculating a bitumen value based at least in part on said reservoir log measurements at that depth, wherein said quantitative reservoir quality value is positively correlated with said calculated light hydrocarbon value and negatively correlated with said calculated bitumen value.

12. The method according to claim 1 wherein said plurality of depths are evenly spaced over a depth interval, and said calculated quantitative reservoir quality values at each of the plurality of depths forms a continuous reservoir quality log over said depth interval.

13. The method according to claim 1 wherein said logging measurements include logging measurements made using a magnetic resonance downhole tool, and said light hydrocarbon value is calculated at least in part by removing contributions from bitumen and subtracting a water volume.

14. The method according to claim 13 wherein said logging measurements includes geochemical measurements, dielectric and/or resistivity logging measurements, and said water volume is obtained from said geochemical, dielectric and/or resistivity log measurements.

15. The method according to claim 13 wherein said bitumen contribution is removed by applying a cutoff to a magnetic resonance response dataset in a $T_2$ dimension.

16. The method according to claim 13 wherein said bitumen contribution is removed by comparing ratios of $T_1/T_2$ in a magnetic resonance response dataset.

17. The method according to claim 1 wherein said logging measurements include logging measurements made using a magnetic resonance downhole tool capable of measuring diffusion, and said light hydrocarbon value is calculated at least in part using diffusion and $T_2$ measurements from said magnetic resonance downhole tool.

18. The method according to claim 1 wherein said calculated reservoir quality values are not based on any analysis of cuttings samples and said borehole is drilled using oil-based-mud.

19. A system for calculating values indicating quality of a hydrocarbon-bearing reservoir formation penetrated by a borehole, the system comprising a processing system configured to receive reservoir log measurement data acquired from logging measurements made in situ at a plurality of depths within the borehole of the formation, for each of the plurality of depths, to calculate a light hydrocarbon value based at least in part on said reservoir log measurement data at that depth, the light hydrocarbon value indicating quantity of light hydrocarbon at that depth, and for each of the plurality of depths, to calculate a quantitative reservoir quality value indicating potential for producing hydrocarbons from the formation at that depth, wherein each of said calculated reservoir quality value is based at least in part on said calculated light hydrocarbon value at that depth.

20. The system of claim 19 wherein said processing system is further configured to, for each of the plurality of depths, calculate an organic carbon value based at least in part on said reservoir log measurements at that depth, wherein said quantitative reservoir quality value is positively correlated with said calculated light hydrocarbon value and negatively correlated with said calculated organic carbon value.

21. The system according to claim 20 wherein said organic carbon value is a total organic carbon value that represents a sum of kerogen, bitumen and light hydrocarbon quantities in the formation.

22. The system according to claim 20 wherein said organic carbon value represents a sum of kerogen and bitumen quantities in the formation.

23. The system according to claim 19 wherein said logging measurements includes logging measurements made using a magnetic resonance downhole tool, and said light hydrocarbon value is calculated at least in part by removing contributions from bitumen and subtracting a water volume.

24. The system according to claim 23 wherein said water volume is a free-water volume which is estimated by subtracting a clay bound water volume from a total water volume, and said clay bound water volume is obtained from said geochemical logging measurements, and said total water volume is obtained from said dielectric and/or resistivity logging measurements.

* * * * *